United States Patent
Sen et al.

(10) Patent No.: US 12,524,461 B2
(45) Date of Patent: Jan. 13, 2026

(54) SYSTEMS AND METHODS FOR USING CONJUNCTIONS IN A VOICE INPUT TO CAUSE A SEARCH APPLICATION TO WAIT FOR ADDITIONAL INPUTS

(71) Applicant: Adeia Guides Inc., San Jose, CA (US)

(72) Inventors: Susanto Sen, Karnataka (IN); Charishma Chundi, Andhra Pradesh (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/239,401

(22) Filed: Aug. 29, 2023

(65) Prior Publication Data

US 2023/0409632 A1    Dec. 21, 2023

Related U.S. Application Data

(63) Continuation of application No. 17/750,532, filed on May 23, 2022, now Pat. No. 11,789,998, which is a (Continued)

(51) Int. Cl.
*G10L 15/22* (2006.01)
*G06F 16/432* (2019.01)
(Continued)

(52) U.S. Cl.
CPC .......... *G06F 16/632* (2019.01); *G06F 16/433* (2019.01); *G06F 16/438* (2019.01); *G06V 10/80* (2022.01); *G06V 40/20* (2022.01); *G06V 40/28* (2022.01); *G10L 15/19* (2013.01); *G10L 15/22* (2013.01); *G10L 15/30* (2013.01); *G10L 2015/223* (2013.01)

(58) Field of Classification Search
CPC .... G06F 16/632; G06F 16/433; G06F 16/438; G06F 18/25; G06F 3/167; G06V 10/80; G06V 40/20; G06V 40/28; G10L 15/19; G10L 15/22; G10L 15/30; G10L 2015/223; G10L 15/24
See application file for complete search history.

(56) References Cited

U.S. PATENT DOCUMENTS 5,715,468 A   2/1998 Budzinski
6,685,477 B1  2/2004 Goldman et al.
(Continued)

OTHER PUBLICATIONS

PCT International Search Report for International Application No. PCT/US2020/065540, dated Apr. 9, 2021 (15 pages).

*Primary Examiner* — Abul K Azad
(74) *Attorney, Agent, or Firm* — HALEY GUILIANO LLP

(57) ABSTRACT

A search is performed based on a voice input combined with user selection of entities displayed on a display screen as well as real-world entities. A voice input is received from the user by a media device, as well as a selection of a first entity being displayed on the media device. A conjunction spoken in the voice input triggers the media device to wait for selection of a second entity before performing the search. After receiving selection of the second entity, a search query is constructed based on the voice input, the first entity, and the second entity. The search query is transmitted to a database and, in response, the media device receives at least one identifier of a least one content item. The at least one identifier is then generated for display to the user.

20 Claims, 11 Drawing Sheets

Related U.S. Application Data continuation of application No. 16/736,076, filed on Jan. 7, 2020, now Pat. No. 11,367,444.

(51) Int. Cl.

| | |
|---|---|
| *G06F 16/438* | (2019.01) |
| *G06F 16/632* | (2019.01) |
| *G06V 10/80* | (2022.01) |
| *G06V 40/20* | (2022.01) |
| *G10L 15/19* | (2013.01) |
| *G10L 15/30* | (2013.01) |

(56) References Cited

U.S. PATENT DOCUMENTS

| | | | |
|---|---|---|---|
| 7,069,215 B1 * | 6/2006 | Bangalore | G10L 15/24 |
| | | | 382/187 |
| 9,031,840 B2 * | 5/2015 | Sharifi | G10L 15/26 |
| | | | 704/226 |
| 9,256,396 B2 | 2/2016 | Monson et al. | |
| 9,390,726 B1 * | 7/2016 | Smus | G06F 3/017 |
| 10,515,121 B1 | 12/2019 | Setlur et al. | |
| 10,542,114 B2 | 1/2020 | Cunico et al. | |
| 10,802,673 B2 | 10/2020 | Kim et al. | |
| 10,845,956 B2 | 11/2020 | Chand | |
| 11,367,444 B2 | 6/2022 | Sen et al. | |
| 11,604,830 B2 | 3/2023 | Sen et al. | |
| 2012/0115112 A1 | 5/2012 | Purushotma et al. | |
| 2012/0197857 A1 | 8/2012 | Huang et al. | |
| 2013/0218896 A1 | 8/2013 | Palay | |
| 2014/0214415 A1 * | 7/2014 | Klein | G06F 3/167 |
| | | | 704/231 |
| 2015/0348430 A1 | 12/2015 | Kasbar | |
| 2016/0109954 A1 | 4/2016 | Harris et al. | |
| 2016/0124706 A1 | 5/2016 | Vasilieff et al. | |
| 2016/0170710 A1 * | 6/2016 | Kim | G06F 3/013 |
| | | | 704/275 |
| 2016/0239259 A1 * | 8/2016 | Lenchner | G10L 15/1822 |
| 2017/0068423 A1 | 3/2017 | Napolitano et al. | |
| 2017/0083214 A1 | 3/2017 | Furesjö et al. | |
| 2018/0046851 A1 | 2/2018 | Kienzle et al. | |
| 2018/0136834 A1 | 5/2018 | Tumwattana | |
| 2020/0258515 A1 | 8/2020 | Suzuki | G06F 3/01 |
| 2021/0118442 A1 * | 4/2021 | Poddar | G06V 40/25 |
| 2021/0168293 A1 * | 6/2021 | Yang | H04N 23/695 |
| 2021/0209171 A1 | 7/2021 | Sen et al. | |
| 2021/0210084 A1 | 7/2021 | Sen et al. | |
| 2021/0295833 A1 | 9/2021 | Rastrow et al. | |
| 2023/0011143 A1 | 1/2023 | Sen et al. | |

\* cited by examiner

SYSTEMS AND METHODS FOR USING CONJUNCTIONS IN A VOICE INPUT TO CAUSE A SEARCH APPLICATION TO WAIT FOR ADDITIONAL INPUTS

CROSS-REFERENCE TO RELATED APPLICATION

This application is a continuation of U.S. patent application Ser. No. 17/750,532, filed May 23, 2022, which is a continuation of U.S. patent application Ser. No. 16/736,076, filed Jan. 7, 2020, now U.S. Pat. No. 11,367,444, the disclosures of which are hereby incorporated by reference herein in their entireties.

BACKGROUND

The present disclosure relates to electronic search systems and, more particularly, performing searches based on selections of both on-screen and real-world entities.

SUMMARY

As the amount of content available to users for consumption continues to increase, the number of content items featuring the same actors, characters, locations, objects, or other entities grows. When viewing a content item, a user may recall having seen a particular actor or character featured in the content item in another content item but may not recall any other details about that other content item. In order to determine what content item he or she is recalling, the user typically has to open a search interface and enter the name of the actor and attempt to locate the content item from a set of search results. The user must spend a lot of time entering the search and reviewing the results before finding the search result corresponding to the content item they recalled. In some cases, the user may not recall the name of the actor, and may only recall seeing the actor in a particular location in a different content item. The user may therefore not be able to search for the content item effectively.

Systems and methods are provided herein for performing a search based on a voice input combined with user selection of entities displayed on a display screen as well as real-world entities. As used herein, "entity" may be an actor, a character, an object, a location, a sound, or the like which can be used as a search parameter to locate and/or filter content items. A voice input is received from the user by a media device, as well as a selection of a first entity being displayed on a display of the media device, which may be any kind of display, including, but not limited to, a touchscreen and/or a virtual reality display. A gesture made by the user is also identified, and a second, real-world entity corresponding to the gesture is determined. The voice input is processed to identify a search operator, and a search query is constructed based on the search operator, the first entity, and the second entity. The search query is transmitted to a database and, in response, the media device receives at least one identifier of a least one content item. The at least one identifier is then generated for presentation to the user visually and/or audibly. In some embodiments, the media device determines an identifier of the first entity and an identifier of the second entity. The search query is then constructed based on the identified search operator, the identifier of the first entity, and the identifier of the second entity.

In some embodiments, the gesture is identified by capturing, using a camera, a motion of the user. A direction of the gesture may be determined. An image representing an area corresponding to the direction of the gesture is then captured using a camera. The captured image is processed, and the second entity is identified. For example, the media device performs image processing to identify a plurality of entities in the image. A path is then extrapolated from the direction of the gesture, and an entity of the plurality of entities, that the path intersects is determined. A second camera can be used to capture a second perspective of the area corresponding to the direction of the gesture. A second path is extrapolated from the direction of the gesture and an entity that intersects both paths is identified as the second entity.

The voice input may also be processed to identify a pronoun corresponding to the second entity. Image processing is then performed to identify a plurality of entities in the image, and a respective pronoun for each entity is determined based on the identity of each entity. The pronoun included in the voice input can be compared with each respective pronoun of each respective entity of the plurality of entities. An entity, of the plurality of entities having, a respective pronoun that matches the pronoun included in the voice input is then selected as the second entity.

The media device may have more than one camera facing in more than one direction. At least one camera can be used to capture the area corresponding to the gesture, which may be in front of the user and beyond the media device. At least one other camera may face the user and capture gestures made by the user in the area between the media device and the user.

A conjunction included in the voice input may be used as a trigger to tell the media device to wait for selection of additional entities before performing a search. The media device receives a selection of a first entity currently being displayed on a display of the media device and also receives a voice input from a user. By processing the voice input, the media device detects a conjunction. In response to detecting the conjunction, the media device waits for a selection of at least one additional entity. A search query is then constructed based on the conjunction, the first entity, and the at least one additional entity. The search query is transmitted to a database and, in response, at least one identifier of at least one content item is received. The at least one identifier is then generated for display to the user.

If the conjunction is a coordinating conjunction, the media device determines a type of the coordinating conjunction and identifies a logical operator corresponding to the type of coordinating conjunction. A search string is then generated comprising the first entity and each additional entity separated by the logical operator. If the conjunction is a subordinating conjunction, the media device determines a type of the subordinating conjunction and identifies a search parameter corresponding to the type of subordinating conjunction. A search string is generated comprising the identified search parameter, the first entity, and the at least one additional entity logically associated with the identified search parameter.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
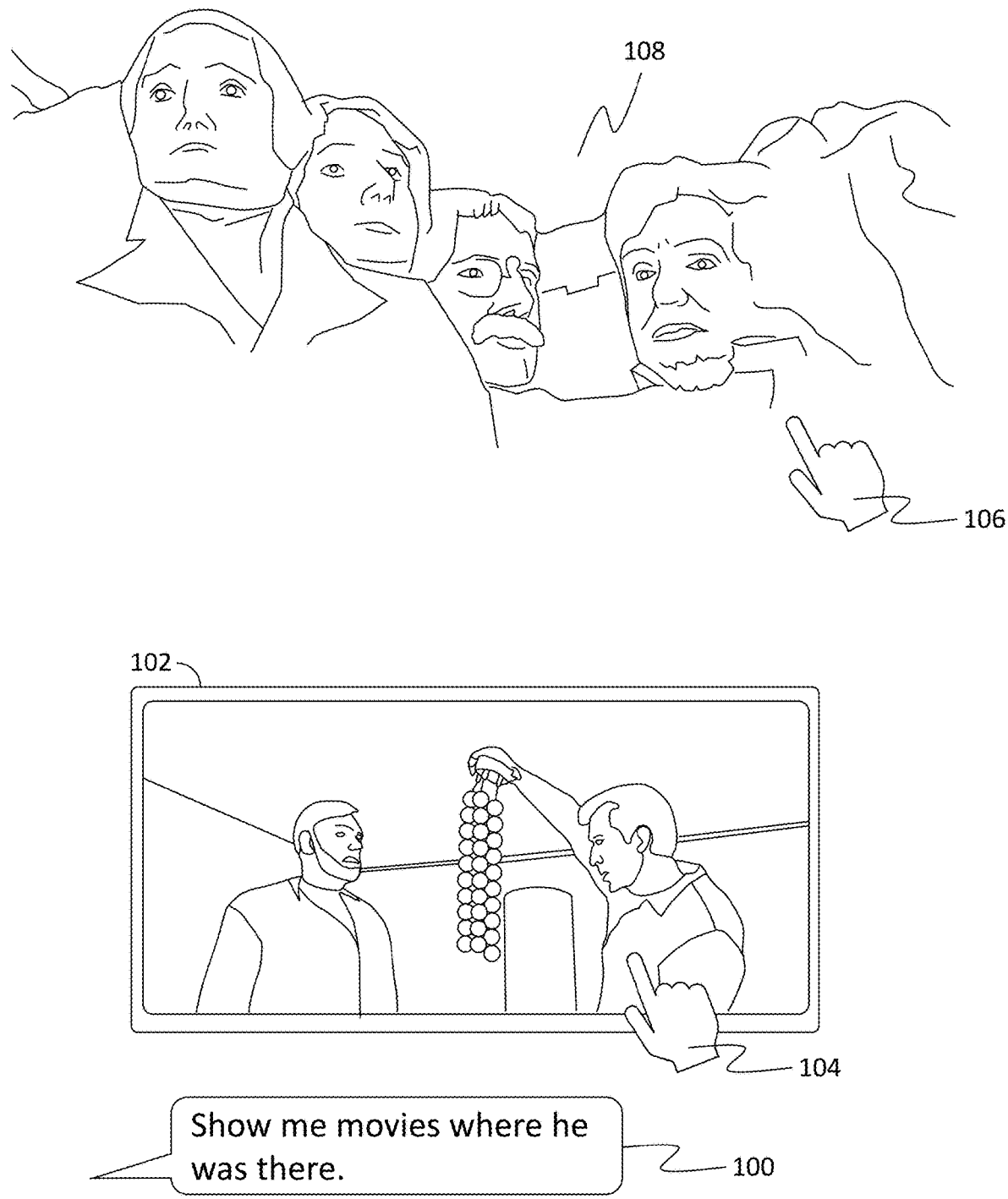
FIG. 1 shows an exemplary voice input and user selections upon which a search query may be based, in accordance with some embodiments of the disclosure.

FIG. 1 shows an exemplary voice input 100 and user selections 104 and 106 upon which a search query may be based, in accordance with some embodiments of the disclosure. While watching a content item on media device 102, voice query 100 may be received from the user requesting to "Show me movies where he was there." While speaking the voice input, the user may make selection 104 by selecting a particular actor displayed on media device 102, and may make selection 106 by pointing or otherwise gesturing at a real-world landmark 108. In the example of FIG. 1, the user is watching the movie "The Rock" while in the vicinity of Mount Rushmore. The user may make selection 104 by tapping on the actor Nicholas Cage, displayed on media device 102. The user may make selection 106 by pointing an outstretched arm toward Mount Rushmore. Media device 102 processes voice input 100 and determines that the pronoun "he" refers to the selected actor, and the pronoun "there" refers to the real-world landmark to which the user gestured. Media device 102 constructs a search query for movies starring Nicholas Cage and featuring a location at or in view of Mount Rushmore. Media device 102 transmits the query to a database and receives in response at least one identifier of at least one movie matching the search criteria. For example, in response to a query for movies starring Nicholas Cage featuring a location at or in view of Mount Rushmore may return an identifier of the movie "National Treasure: Book of Secrets."

Figure 2:
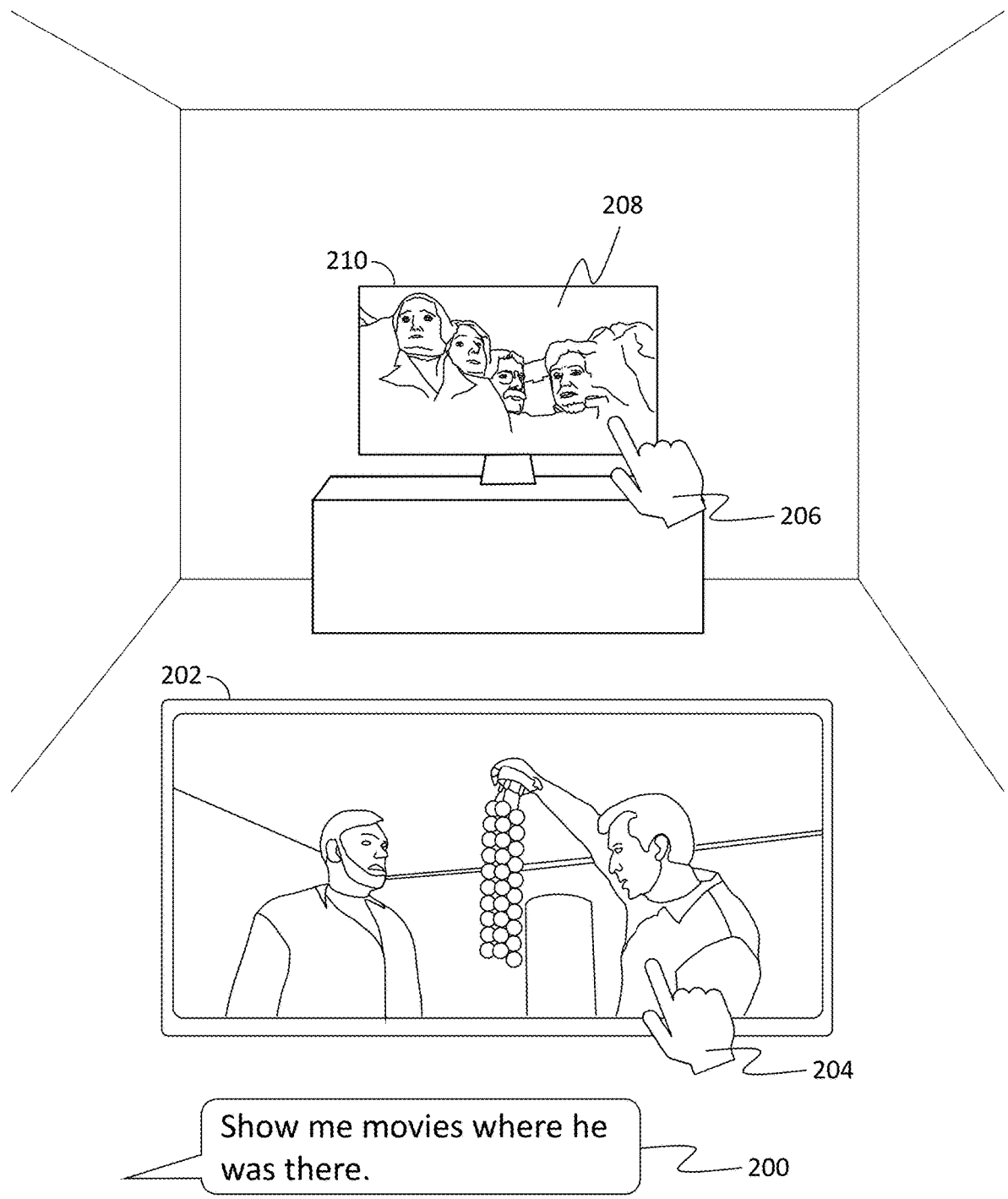
FIG. 2 shows a second exemplary voice input and user selections upon which a search query may be based, in accordance with some embodiments of the disclosure.

FIG. 2 shows a second exemplary voice input and user selections upon which a search query may be based, in accordance with some embodiments of the disclosure. In the example of FIG. 2, the real-world object to which the user gestured corresponds to a second display device 210. Media device 202, after processing voice input 200 and user selection 204, may determine that the pronoun "there" refers to a location and that display device 210 is currently displaying a location, such as landmark 208. Media device 202 therefore determines that the entity selected by selection 206 is not display device 210 itself, but rather, landmark 208, which is currently displayed on display device 210.

Figure 3:
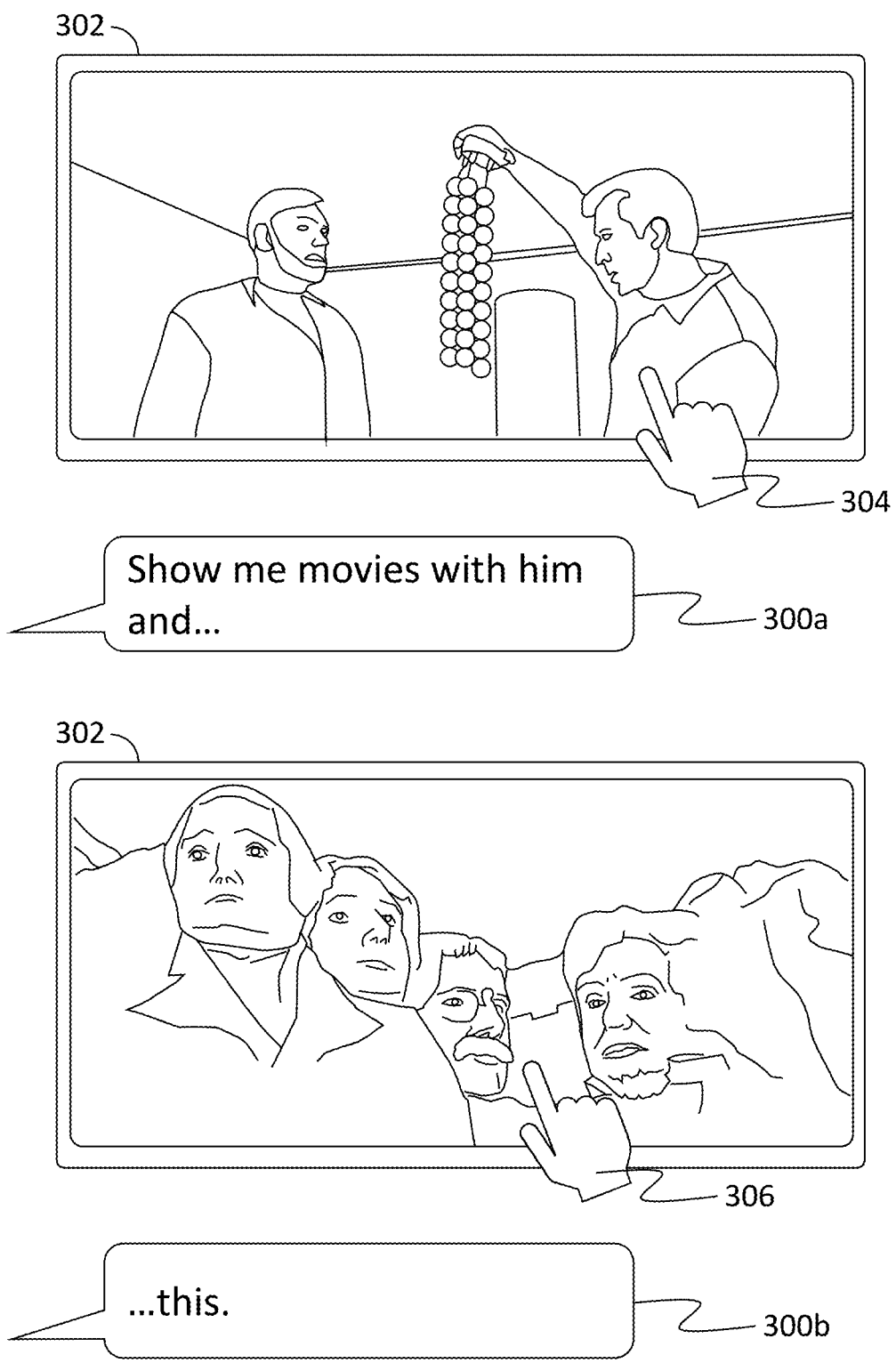
FIG. 3 shows a third exemplary voice input and user selections upon which a search query may be based, in accordance with some embodiments of the disclosure.

FIG. 3 shows a third exemplary voice input and user selections upon which a search query may be based, in accordance with some embodiments of the disclosure. In some embodiments, when the user wants to select more than one entity for a search, it may take time for the user to locate each entity to be selected. The user may pause during the voice input after each selection and may speak a conjunction meant to logically join or separate the selected entities. For example, the user may speak voice input 300a "Show me movies with him and . . ." while making selection 304 of an actor displayed on media device 302. Media device 302, upon detecting the conjunction "and," will wait for at least one additional selection before constructing a search query and/or performing a search. The user may then pause and/or navigate through the current content item or other content items to locate a second entity. Once located, the user may speak voice input 300b "this" while making selection 306. If no further conjunctions are detected, media device 302 constructs a search query and performs a search.

Figure 4:
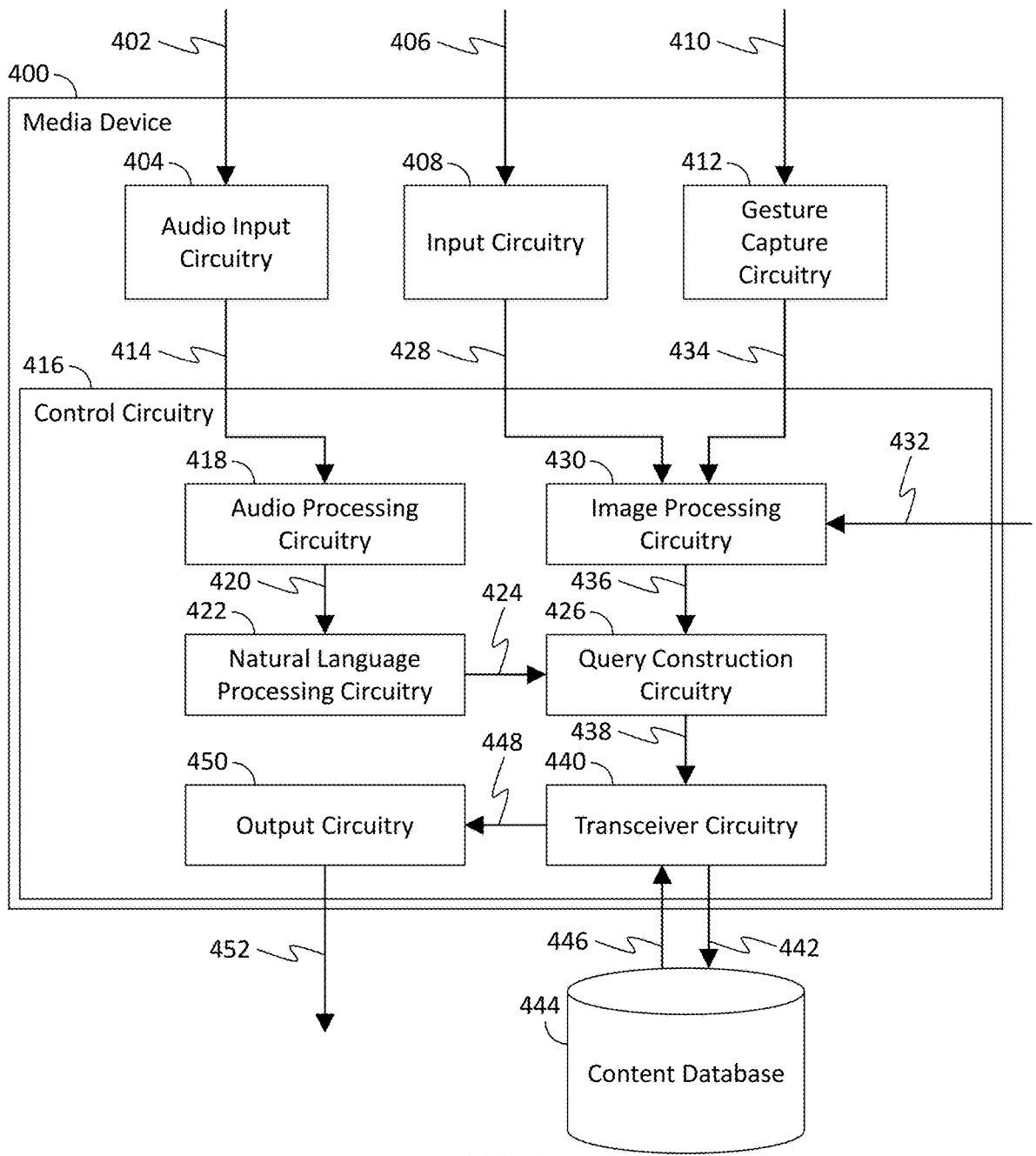
FIG. 4 is a block diagram showing components and data flow therebetween of an exemplary system for performing a search based on a voice input and user selection of on-screen and real-world entities, in accordance with some embodiments of the disclosure.

FIG. 4 is a block diagram showing components and data flow therebetween of an exemplary system for performing a search based on a voice input and user selection of on-screen and real-world entities, in accordance with some embodiments of the disclosure. Media device 400, which may be any device capable of outputting audio and/or video content and accepting user input (e.g., a smartphone, a smart TV, a tablet, or a computer), receives 402 voice input using audio input circuitry 404. Audio input circuitry 404 may include a microphone for directly capturing audio data and may also include an analog-to-digital converter to convert the captured audio data into a digital signal that can be further processed by media device 400. Alternatively or additionally, audio input circuitry 404 may include a wired or wireless data connection (e.g., an ethernet connection, a WiFi module, a Bluetooth module, etc.) for receiving audio data captured by an external device, such as a remote control having an embedded microphone.

Media device 400 also receives 406, using input circuitry 408, an input selecting a first entity being generated for display by media device 400. The input may be a tap or other touch-based gesture made by the user on a touchscreen interface of media device 400. Alternatively or additionally, the input may be a selection made using a human interface device such as a mouse or keyboard. Input circuitry 408 may process the input to identify a portion of the display corresponding to the input. For example, input circuitry 408 may determine a set of coordinates on a screen that correspond to the input.

Media device 400 also captures 410, using gesture capture circuitry 412, a gesture made by the user. Gesture capture circuitry 412 may capture hand movements and other gestures made by a user to indicate an entity in the real-world area surrounding the user. Gesture capture circuitry 412 may include at least one camera or other imaging sensor, such as an infrared sensor, ultrasonic motion sensor, or any other suitable motion capture sensor. Alternatively or additionally, gesture capture circuitry 412 may receive accelerometer or other motion data from a device of the user such as a smartphone or wearable device.

Once received, the voice input is transferred 414 to control circuitry 416 for processing. Control circuitry 416 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Control circuitry 416 processes the voice input using audio processing circuitry 418. Audio processing circuitry 418 further processes the audio data captured by audio input circuitry 404 into a useable data format and transfers 420 it to natural language processing circuitry 422, where it is analyzed to identify words spoken in the voice input. Natural language processing circuitry 422 identifies each word and determines a part of speech for each identified word. Natural language processing circuitry 422 generates a transcription of the voice input and transfers 424 the transcription to query construction circuitry 426.

Data describing the touch input, such as coordinates of the touch and/or direction of a swipe gesture, are transferred 428 from input circuitry 408 to image processing circuitry 430. As a result of receiving the touch input, image processing circuitry 430 receives 432 an image representing the media displayed on the screen at the time of the touch input. For example, a single frame of video may be extracted from the content item at a timestamp corresponding to the time at which the touch input was received. Image processing circuitry 430 identifies entities displayed in the image using, for example, edge detection or facial recognition, or using metadata describing the contents of the frame represented by the image. Using the data describing the touch input, image processing circuitry 430 determines which of the identified entities was selected by the user.

An image representing a real-world area and containing the gesture captured by gesture capture circuitry 412 is transferred 434 from gesture capture circuitry 412 to image processing circuitry 430. Image processing circuitry 430, using edge detection or any other suitable image processing technique, identifies a hand or other body part of the user used to make the gesture. Image processing circuitry 430 may compare the captured gesture with known gestures to determine whether the user is pointing at a specific entity, or gesturing widely to an expansive area encompassing a location or landmark. For example, if the user's hand is closed except for a fully extended index finger, image processing circuitry 430 may determine that the user is pointing at a specific entity. Image processing circuitry 430, using methods described above, may identify entities in the image and identify to which entity the user is pointing. For example, image processing circuitry 430 may extrapolate a path following the user's index finger and determine that an entity intersecting the path is the entity to which the user is pointing. In some embodiments, gesture capture circuitry 412 may include more than one camera, each capturing an image representing a different perspective of the area corresponding to the gesture. Image processing circuitry 430 may analyze each captured image and extrapolate a path following the user's index finger in each image. Image processing circuitry 430 identifies an entity that intersects the extrapolated path in each of the captured images. This allows image processing circuitry 430 to more accurately identify the selected entity. For example, in a first image, more than one entity may intersect the extrapolated path, while only one of those entities intersects the extrapolated path in a second image. Image processing circuitry 430 identifies the entity that intersects both paths as the selected entity.

In some embodiments, the second entity may be a sound. Media device 400 may determine that the user has selected a sound as the second entity based on the voice input. For example, the user may say "What was that movie he was in that had this song?" The pronoun "he" may refer to an actor currently being displayed, and "this song" may refer to a song currently playing in the real world. The user may make a wide gesture to indicate the song or point in the direction of the source of the song, such as another media device, a stereo system, radio, or other audio source. Media device 400 may use audio input circuitry 404 to capture the indicated sound.

After each selected entity has been identified, image processing circuitry 430 transfers 436 the selected entities to query construction circuitry 426. For example, image processing circuitry 430 may determine an identifier of the first selected entity by accessing metadata corresponding to the content and determining what entity appears in the extracted frame at the selected coordinates. Image processing circuitry 430 may perform facial recognition or object recognition on the second selected entity and, using a database of entities, identify the second selected entity. Image processing circuitry 430 may also use this process to identify the first selected entity. Image processing circuitry 430 then transfers 436 the identifiers of each entity to query construction circuitry 426.

Query construction circuitry 426 combines the voice input with the selected entities to generate a valid search string to be used in performing a search for content. Query construction circuitry 426 identifies the type of search to be performed from the transcription of the voice input. For example, based on the transcription "Show me movies where he was there" (e.g., voice input 100) query construction circuitry 426 determines that a search for movies has been requested. Query construction circuitry 426 generates a search string, such as SQL command string "SELECT*FROM movies WHERE actor={first entity} AND location={second entity}" where {first entity} represents an identifier of the first entity and {second entity} represents an identifier of the second entity in a case where the first selected entity is an actor and the second entity identified from the gesture is a location or landmark.

Query construction circuitry 426 passes 438 a search query comprising the search string to transceiver circuitry 440. Transceiver circuitry 440 comprises a network connection over which data can be transmitted to and received from remote devices, such as an ethernet connection, WiFi connection, or connection employing any other suitable networking protocol. Transceiver circuitry 440 transmits 442 the search query to content database 444. Content database 444 may be stored on a remote server. Alternatively, content database 444 may be stored in local memory of media device 400. In such embodiments, transceiver circuitry 440 may include a data bus interface or other hardware level interface for transmitting queries to local memory and receiving responses therefrom. Transceiver circuitry 440 receives 446 from content database 444 at least one identifier of at least one content item that matches the search query. For example, in response to a search query "SELECT*FROM movies WHERE actor='Nicholas Cage' AND location='Mount Rushmore'," transceiver circuitry 440 may receive at least one identifier of the movie "National Treasure: Book of Secrets." Transceiver circuitry 440 then transmits 448 the at least one identifier of the at least one content item to output circuitry 450. Output circuitry 450 generates the identifiers for presentation to the user and outputs 452 the identifiers. The identifiers may be displayed on a screen or other display device, may be processed through a text-to-speech engine for audio output and transmitted to a speaker or other audio output device, or both.

In some embodiments, both the first and second entities are selected from content displayed on media device 400. The voice input may include a coordinating conjunction (e.g., and, but, or) or a subordinating conjunction (e.g., while, unless, when). Natural language processing circuitry 422 detects the conjunctions and triggers media device 400 to wait for additional selections before constructing the search string. If the conjunction is a coordinating conjunction, query construction circuitry 426 identifies a logical operator that corresponds to the conjunction and generates a search string comprising each selected entity separated by the logical operator. For example, if the conjunction is "and," then query construction circuitry 426 may identify "AND" as the corresponding logical operator in an SQL command. If the conjunction is a subordinating conjunction, query construction circuitry 426 identifies a search parameter corresponding to the conjunction and generates a search string comprising the search parameter and the selected entities logically associated with the search parameter. For example, the user says "Show me movies with him before he met her," where "him" corresponds to selection of a first character and "her" corresponds to selection of a second character. Natural language processing circuitry 422 identifies the conjunction "before." Query construction circuitry 426 may identify release date as a search parameter, retrieve a release date for the earliest content item in which the two characters appear together, and generate a search string such as "SELECT*FROM movies WHERE character={him} AND release_date<{date}" where {him} represents an identifier of the character and {date} represents the release date of the earliest content item in which the two characters appear together.

In some embodiments, the user may select a sound as an entity. For example, the user may say "What was that movie he was in and this song was playing?" The pronoun "he" may correspond to selection of an actor displayed on media device 400. The pronoun "this" may be identified by natural language processing circuitry 422 as part of the phrase "this song" or the gesture captured by gesture capture circuitry 412 may be the user pointing to a radio, stereo, or other sound source, or generally gesturing upwards to indicate an ambient sound. Media device 400 may use audio input circuitry 404 to capture the indicated sound as the second entity.

Figure 5:
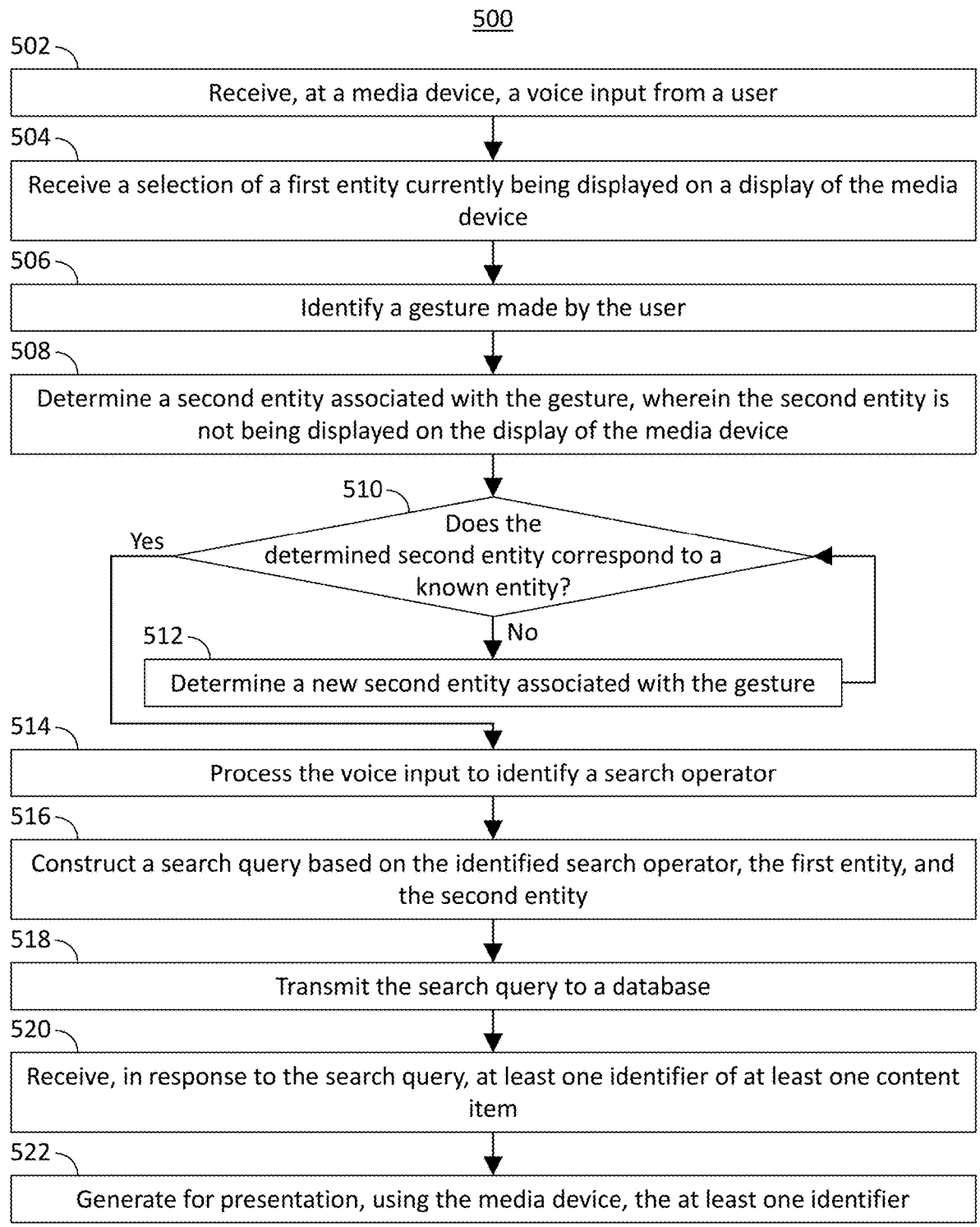
FIG. 5 is a flowchart representing a process for performing a search based on a voice input and selection of on-screen and real-world entities, in accordance with some embodiments of the disclosure.

FIG. 5 is a flowchart representing an illustrative process 500 for performing a search based on a voice input and selection of on-screen and real-world entities, in accordance with some embodiments of the disclosure. Process 500 may be implemented on control circuitry 416. In addition, one or more actions of process 500 may be incorporated into or combined with one or more actions of any other process or embodiment described herein.

At 502, media device 400, using audio input circuitry 404, receives a voice input from a user. The voice input may be directly captured using a microphone of audio input circuitry 404, or may be received by audio input circuitry 404 in a digital format from a separate audio capture device. At 504, media device 400, using input circuitry 408, receives a selection of a first entity currently being displayed on a display of media device 400. For example, the user may tap, swipe, or perform other gestures on a touchscreen interface of media device 400. Input circuitry 408 determines the display coordinates corresponding to the input and identifies, using image processing circuitry 430, an entity located at the determined coordinates. The input may be received concurrently with the voice input. The input may further be received at substantially the same time as the time at which the user speaks a pronoun in the voice input. If more than one entity is located at the determined coordinates, control circuitry 416 may determine, using natural language processing circuitry 422 and image processing circuitry 430, which entity corresponds to the pronoun spoken simultaneously with the input.

At 506, media device 400, using gesture capture circuitry 412, identifies a gesture made by the user. For example, gesture capture circuitry 412 may include a camera which captures an image of an area in front of the user and including a hand or other body part used to make the gesture. Image processing circuitry 430 may determine, based on the type of gesture (e.g., pointing), a path along which the selected entity lies within the captured image. At 508, media device 400 determines a second entity associated with the gesture, wherein the second entity is not being displayed on the display of media device 400. Control circuitry 416 may again use a combination of natural language processing circuitry 422 and image processing circuitry 430 to identify a specific entity in the captured image.

At 510, control circuitry 416 determines whether the determined second entity corresponds to known entity, i.e., an entity for which a search can be performed. If not ("No" at 510), then, at 512, control circuitry 416, using image processing circuitry 430, determines a new second entity associated with the gesture, and processing returns to step 510. Once a known second entity is determined ("Yes" at 510), then, at 514, control circuitry 416, using natural language processing circuitry 422, processes the voice input to identify a search operator. For example, the voice input may include a request for movies. Natural language processing circuitry 422 may identify "movies" as a search operator for which a query can be constructed. At 516, control circuitry 416, using query construction circuitry 426, constructs a search query based on the identified search operator, the first entity, and the second entity. For example, in response to a voice input "Show me movies in which he was there" combined with a first selection of Nicholas Cage displayed on media device 400 and a gesture selecting Mount Rushmore, query construction circuitry 426 may construct a query to for movies featuring Nicholas Cage as an actor and Mount Rushmore as a location.

At 518, control circuitry 416, using transceiver circuitry 440, transmits the query to a database such as content database 444. At 520, in response to the query, media device receives from the database at least one identifier of at least one content item matching the search query. For example, in response to a search for movies featuring Nicholas Cage and Mount Rushmore, an identifier of the movie "National Treasure: Book of Secrets" may be received from the database. At 522, the at least one identifier is generated for display to the user on media device 400.

The actions or descriptions of FIG. 5 may be used with any other embodiment of this disclosure. In addition, the actions and descriptions described in relation to FIG. 5 may be done in any suitable alternative orders or in parallel to further the purposes of this disclosure.

Figure 6:
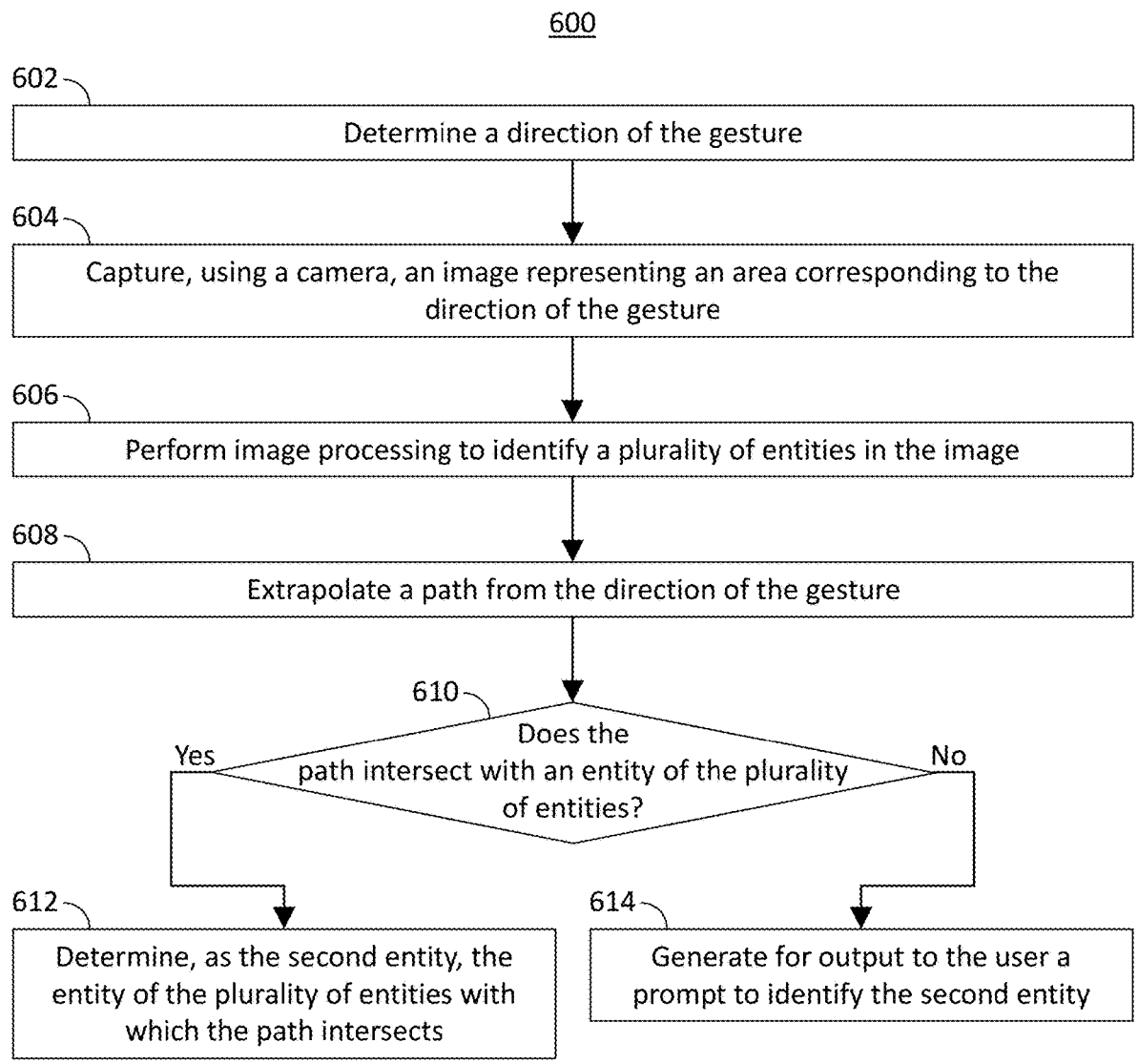
FIG. 6 is a flowchart representing a process for determining the selected real-world entity based on a user gesture, in accordance with some embodiments of the disclosure.

FIG. 6 is a flowchart representing an illustrative process 600 for determining the selected real-world entity based on a user gesture, in accordance with some embodiments of the disclosure. Process 600 may be implemented on control circuitry 416. In addition, one or more actions of process 600 may be incorporated into or combined with one or more actions of any other process or embodiment described herein.

At 602, control circuitry 416, using image processing circuitry 430, determines a direction of the gesture. For example, gesture capture circuitry 412 tracks the user's motions and identifies the user's hand or other body part used to make the gesture and the type of gesture being made. If the gesture is a pointing gesture, with the user's hand being closed except for an outstretched index finger, gesture capture circuitry 412 determines that the direction indicated by the user's index finger is the direction of the gesture. If the gesture is a more expansive gesture, with an open hand held with the palm up, capture circuitry 412 determines a wider range of direction centered on the user's middle finger.

At 604, media device 400 captures, using a camera, an image representing an area corresponding to the direction of the gesture and, at 606, performs image processing, using image processing circuitry 430, to identify a plurality of entities in the captured image. For example, image processing circuitry 430 may use edge detection, object recognition, facial recognition, or any other image processing technique suitable for identifying individual entities in an image. In some embodiments, multiple images may be captured from multiple cameras, each showing a different perspective of the area corresponding to the gesture. Image processing circuitry 430 processes each captured image and may use data generated from the processing of one image to help identify entities in other images. At 608, image processing circuitry 430 extrapolates a path from the direction of the gesture. For example, if the gesture is a pointing gesture, image processing circuitry 430 may use the user's index finger as a basis for extrapolating a path. If the gesture is a more expansive gesture, image processing circuitry 430 may extrapolate a path from the direction of the user's middle finger, or may extrapolate a range of paths beginning at the user's middle finger and covering an area within a 20° angle centered on the user's middle finger (i.e., 10° to either side of the user's middle finger).

At 610, control circuitry 416, using image processing circuitry 430, determines whether the path intersects an entity of the plurality of entities identified in the image. If so ("Yes" at 610), then, at 612, control circuitry 416 determines, as the second entity, the entity of the plurality of entities that the path intersects. If the path does not intersect any of the entities ("No" at 610), then, at 614, control circuitry 416 may generate for output to the user a prompt to identify the second entity. For example, control circuitry 416, using output circuitry 450, may display the captured image to the user and ask the user to select an entity in the image as the second entity.

The actions or descriptions of FIG. 6 may be used with any other embodiment of this disclosure. For example, the process of FIG. 6 can be used to perform steps 506 and 508 of FIG. 5. In addition, the actions and descriptions described in relation to FIG. 6 may be done in any suitable alternative orders or in parallel to further the purposes of this disclosure.

Figure 7:
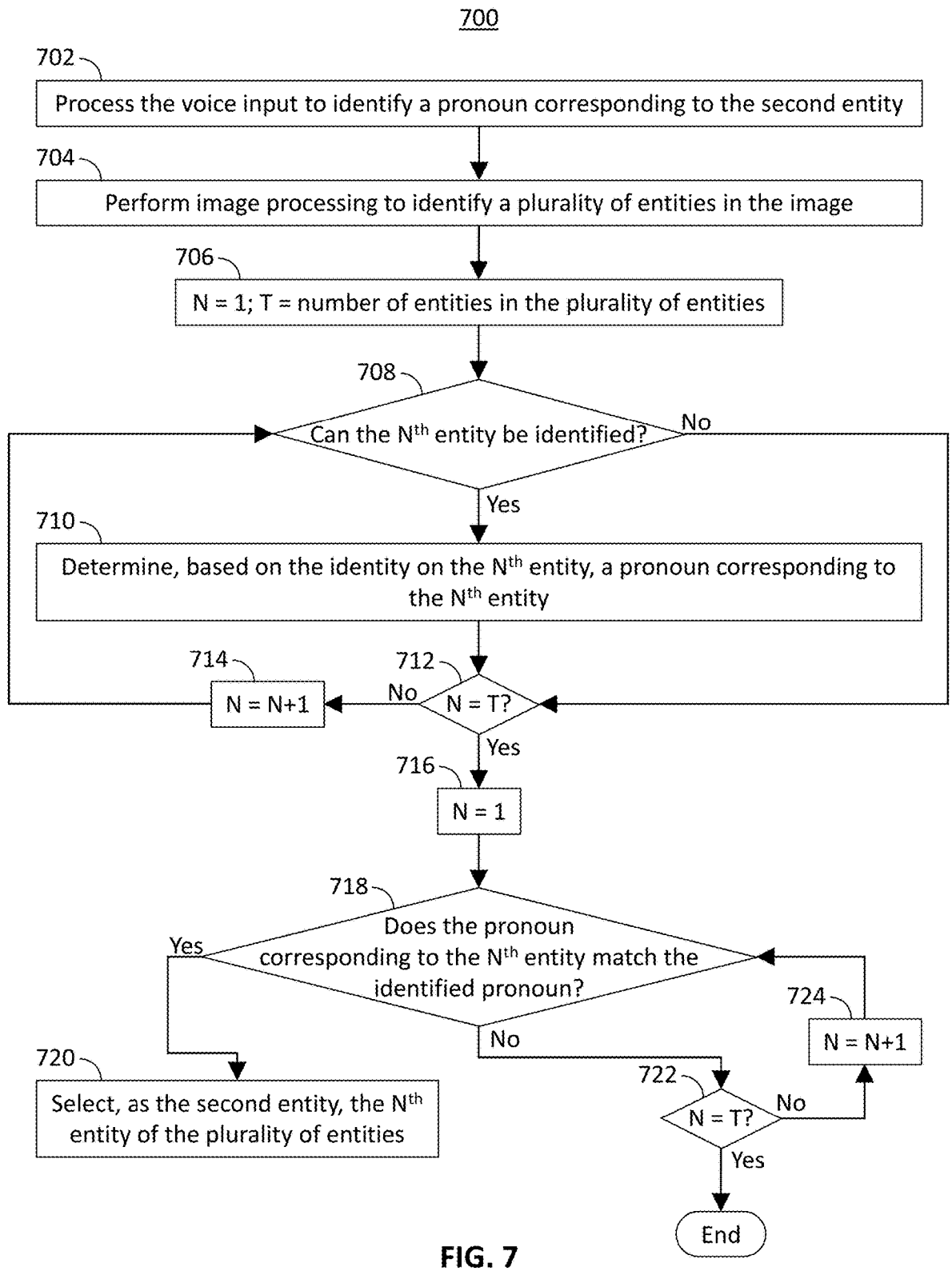
FIG. 7 is a flowchart representing a process for determining a selected entity based on a pronoun included in the voice input, in accordance with some embodiments of the disclosure.

FIG. 7 is a flowchart representing an illustrative process 700 for determining a selected entity based on a pronoun included in the voice input, in accordance with some embodiments of the disclosure. Process 700 may be implemented on control circuitry 416. In addition, one or more actions of process 700 may be incorporated into or combined with one or more actions of any other process or embodiment described herein.

At 702, control circuitry 416, using natural language processing circuitry 422, processes the voice input to identify a pronoun corresponding to the real-world entity associated with the gesture. Natural language processing circuitry 422 may process each word of the voice input, determine a part of speech for each word, and track the number of each part of speech identified. After encountering a second pronoun (where the first pronoun corresponds to an on-screen entity selected by the user), natural language processing circuitry 422 determines that the second pronoun corresponds to the real-world entity. Alternatively, natural language processing circuitry 422 may process the voice input in real time as the user speaks and may simultaneously monitor gesture capture circuitry 412 for identification of a gesture made by the user. If gesture control circuitry 412 reports identification of a gesture made by the user, natural language processing circuitry 422 may determine if a pronoun was spoken at the same time as the time the gesture was made, or within a threshold amount of time from the time the gesture was made, such as 0.5 seconds. If a pronoun was spoken at or within the threshold amount of time from the time the gesture was made, natural language processing circuitry 422 identifies that pronoun as corresponding to the real-world entity.

At 704, control circuitry 416, using image processing circuitry 430, performs image processing to identify a plurality of entities in a captured image representing the area corresponding to the direction of the gesture. This may be accomplished using methods described above in connection with FIG. 6. At 706, control circuitry 416 initializes a counter variable N, setting its value to one, and a variable T representing the number of entities in the plurality of entities identified in the image. At 708, control circuitry 416 determines whether the $N^{th}$ entity can be identified. For example, using methods described above in connection with FIG. 6, control circuitry 416 determines whether the $N^{th}$ entity is a known entity. If the $N^{th}$ entity can be identified ("Yes" at 708), then, at 710, control circuitry 416 determines, based on the identity of the $N^{th}$ entity, a pronoun corresponding to the $N^{th}$ entity. After determining a pronoun corresponding to the $N^{th}$ entity, or if the $N^{th}$ entity cannot be identified ("No" at 708), at 712, control circuitry 416 determines whether N is equal to T, meaning identification of all entities of the plurality of entities has been attempted. If N is not equal to T ("No" at 712), then, at 714, control circuitry 416 increments the value of N by one, and processing returns to step 708.

If N is equal to T, meaning identification of all entities in the plurality of entities has been attempted ("Yes" at 712), then, at 716, control circuitry 416 resets the value of N to one. Then, at step 718, control circuitry 416 determines whether the pronoun corresponding to the $N^{th}$ entity matches the identified pronoun corresponding to the real-world entity. If so, ("Yes" at 718), then, at 720, control circuitry 416 selects, as the second entity, the $N^{th}$ entity of the plurality of entities. If the pronoun corresponding to the $N^{th}$ entity does not match the identified pronoun corresponding to the second entity ("No" at 718), then, at 722, control circuitry 416 determines whether N is equal to T, meaning that the pronoun corresponding to each entity of the plurality of entities has been compared with the identified pronoun corresponding to the second entity. If N is not equal to T ("No" at 722), then, at 724, control circuitry 416 increments the value of N by one, and processing returns to step 718. If N is equal to T ("Yes" at 722), then the process ends.

In some embodiments, rather than select the $N^{th}$ entity as the second entity at step 720, control circuitry 416 may prompt the user the confirm whether the $N^{th}$ entity is the selected entity. This is because there may be more than one entity in the captured image representing the area corresponding to the direction of the gesture having a pronoun that matches the identified pronoun.

The actions or descriptions of FIG. 7 may be used with any other embodiment of this disclosure. In addition, the actions and descriptions described in relation to FIG. 7 may be done in any suitable alternative orders or in parallel to further the purposes of this disclosure. For example, after determining, at 710, based on the identity of the $N^{th}$ entity, a pronoun corresponding to the $N^{th}$ entity, control circuitry 416 may perform the actions of step 718 to determine if the pronoun corresponding to the $N^{th}$ entity matches the identified pronoun. In this embodiment, steps 716, 722, and 724 need not be performed, as control circuitry 416 steps through each of the N entities only once. Additionally, in this embodiment, the process may end after step 720, and not proceed to step 712. In other words, control circuitry 416 may not perform any further analysis of other entities once an entity is selected.

Figure 8:
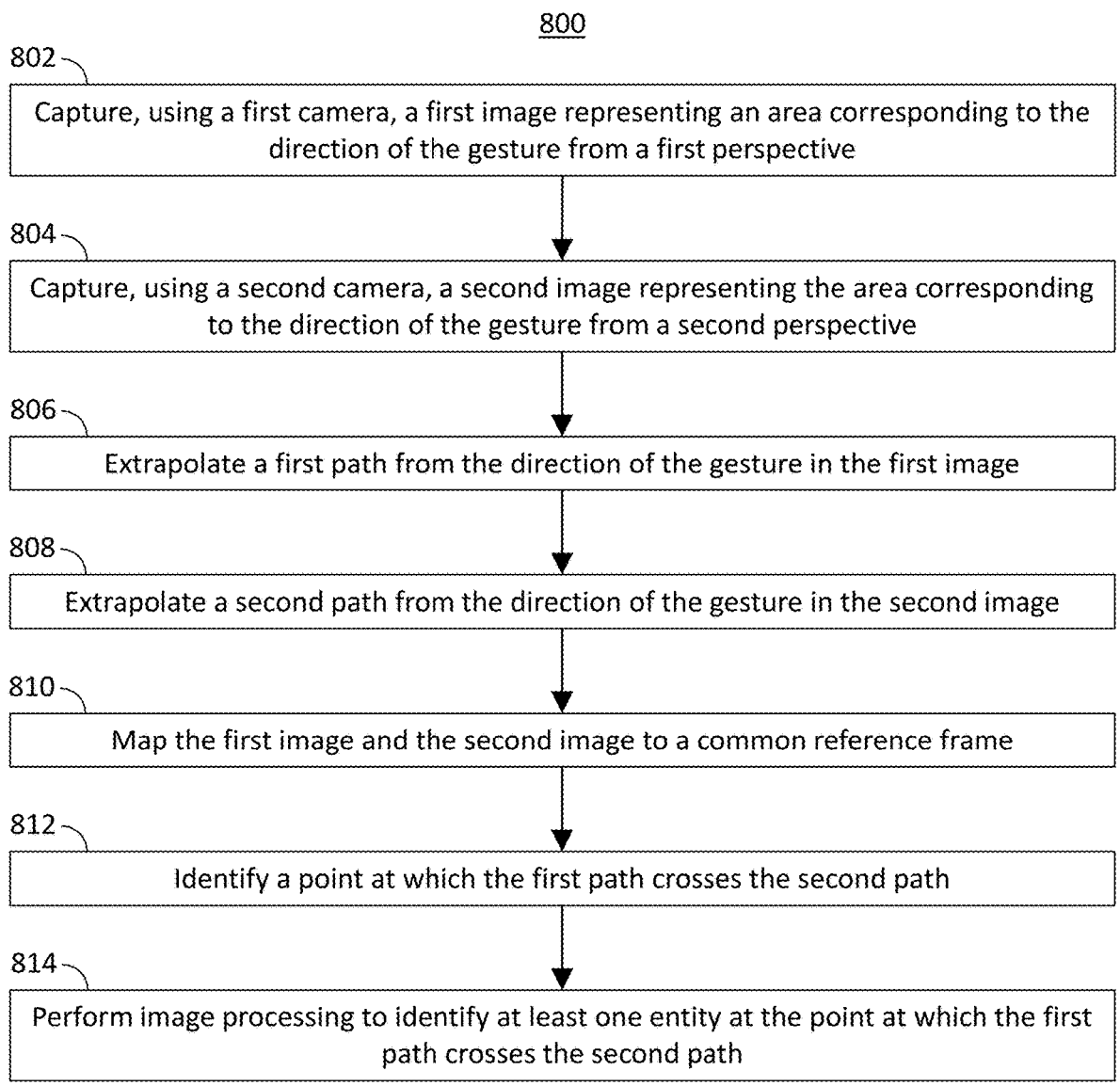
FIG. 8 is a flowchart representing a second process for determining the selected real-world entity based on a user gesture, wherein two cameras are used to capture images including both the gesture and the corresponding area from different angles, in accordance with some embodiments of the disclosure.

FIG. 8 is a flowchart representing a second illustrative process 800 for determining the selected real-world entity based on a user gesture, wherein two cameras are used to capture images including both the gesture and the corresponding area from different angles, in accordance with some embodiments of the disclosure. Process 800 may be implemented on control circuitry 416. In addition, one or more actions of process 800 may be incorporated into or combined with one or more actions of any other process or embodiment described herein.

At 802, media device 400, using a first camera, captures a first image representing an area corresponding to the direction of the gesture from a first perspective and, at 804, using a second camera, captures a second image representing the area corresponding to the direction of the gesture from a second perspective. For example, gesture control circuitry 412 may include two cameras, each positioned to capture an image of the area corresponding to the direction of the gesture from a different angle.

At 806, control circuitry 416, using image processing circuitry 430, extrapolates a first path from the direction of the gesture captured in the first image. This may be accomplished using methods described above in connection with FIG. 6. At 808, image processing circuitry 430 may similarly extrapolate a second path from the direction of the gesture captured in the second image. At 810, image processing circuitry 430 maps the first image and the second image to a common reference frame. For example, image processing circuitry 430 may use the distance between each camera to determine a difference in observational angles captured by each camera. Based on the difference in observational angles, image processing circuitry 430 may combine the two images into a single stereoscopic image. Alternatively or additionally, image processing circuitry 430 may use transformation matrices to stretch, skew, or otherwise translate each image into an alignment while maintaining each path.

At 812, image processing circuitry 430 identifies a point at which the first path crosses the second path. For example, image processing circuitry 430 may identify a set of X,Y coordinates in the common reference frame delineating each path and determine that a particular set of X,Y coordinates appears in both the set of coordinates delineating the first path and the set of coordinates delineating the second path. At 814, image processing circuitry 430 processes the image to identify at least one entity at the point at which the first path crosses the second path. This may be accomplished using methods described above in connection with FIG. 6.

As an example, in some cases, the media device may be a smartphone that includes two rear-facing cameras. The user may be holding the smartphone close to himself or herself and may point to an entity with an outstretched arm such that both the entity and at least the user's hand are visible to both cameras. The smartphone may capture an image using both cameras, each providing the smartphone with a different viewing angle of the user's hand and the entity to which the user has pointed. The smartphone processes both images to determine a respective path corresponding to the gesture in each image and determines a point at which the two paths cross. The smartphone identified the entity at that point as the entity selected by the user.

The actions or descriptions of FIG. 8 may be used with any other embodiment of this disclosure. In addition, the actions and descriptions described in relation to FIG. 8 may be done in any suitable alternative orders or in parallel to further the purposes of this disclosure.

Figure 9:
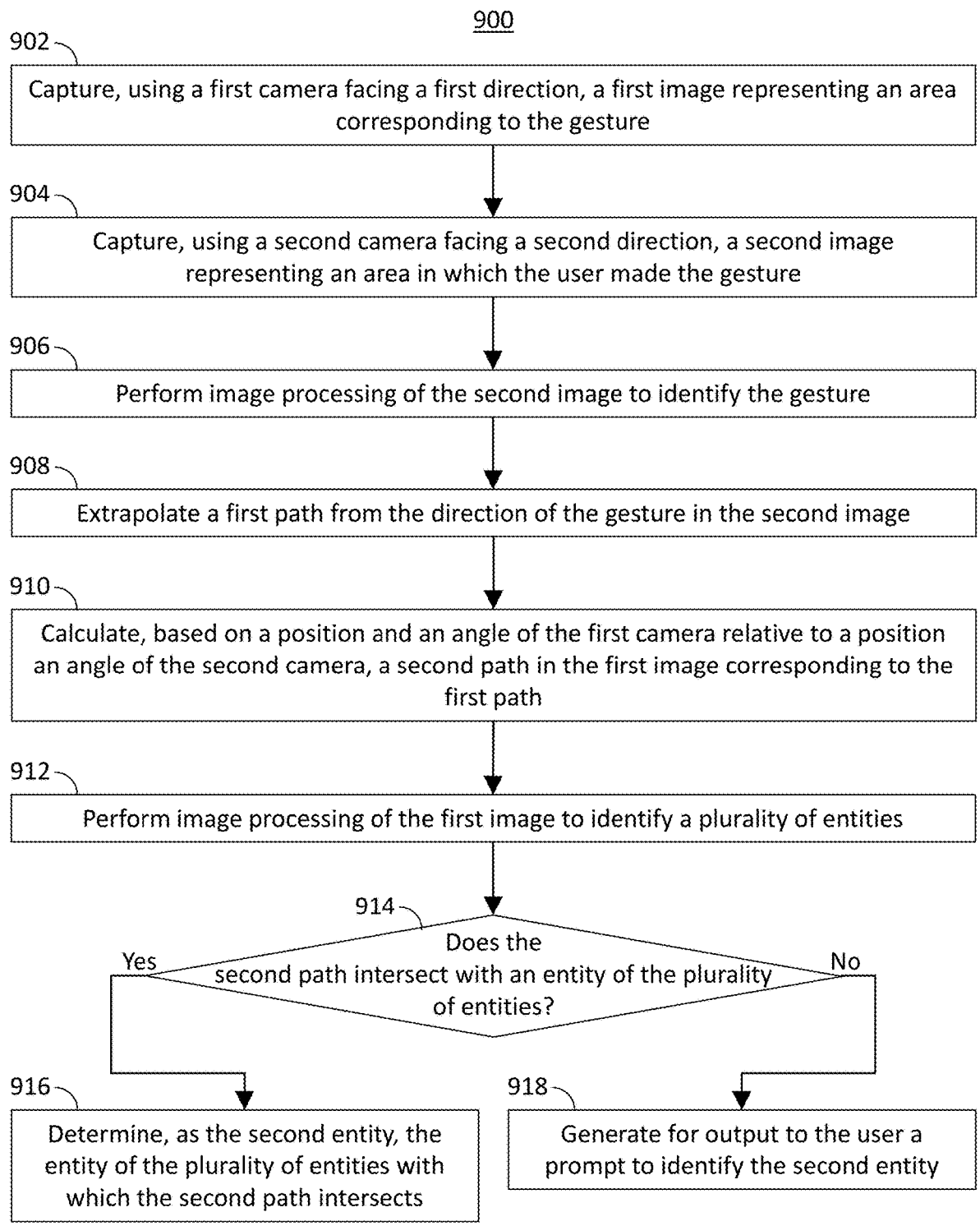
FIG. 9 is a flowchart representing a third process for determining the selected real-world entity based on a user gesture, wherein a first camera is used to capture an image of the gesture while a second camera is used to capture an image including the entity, in accordance with some embodiments of the disclosure.

FIG. 9 is a flowchart representing a third illustrative process 900 for determining the selected real-world entity based on a user gesture, wherein a first camera is used to capture an image of the gesture while a second camera is used to capture an image including the entity, in accordance with some embodiments of the disclosure. Process 900 may be implemented on control circuitry 416. In addition, one or more actions of process 900 may be incorporated into or combined with one or more actions of any other process or embodiment described herein.

At 902, control circuitry 416 captures, using a first camera facing a first direction, a first image representing an area corresponding to the gesture. This may be accomplished using methods described above in connection with FIG. 6. At 904, control circuitry 416 similarly captures, using a second camera facing a second direction, a second image representing an area in which the user made the gesture. For example, the area corresponding to the direction of the gesture may be in front of the user and beyond media device 400, while the area in which the user made the gesture is between the user and media device 400. A first camera on the back side of media device 400 captures the first image corresponding to the direction of the gesture, while a second camera on media device 400 captures an image of the gesture made by the user in a space between the user and media device 400. At 906, control circuitry 416, using image processing circuitry 430, processes the second image to identify the gesture. This may be accomplished using methods described above in connection with FIG. 5. At 908, image processing circuitry 430 extrapolates a first path from the direction of the gesture. This may be accomplished using methods described above in connection with FIG. 5.

At 910, control circuitry 416 calculates, based on a position and an angle of the first camera and a position and an angle of the second camera, a second path in the first image corresponding to the first path. Control circuitry 416 may retrieve data regarding the physical arrangement of the first and second cameras within media device 400 and other physical characteristics of media device 400. For example, the data may indicate the overall dimensions of media device 400 and may also include the position of each camera on media device 400 and an angle of each camera relative to the face of media device 400 on which each camera sits. Using data describing the second camera, control circuitry 416 calculates an orientation of the first path relative to the position and angle of the first camera. Control circuitry 416 then determines the second path in the first image corresponding to the first path.

At 912, image processing circuitry 430 performs image processing of the first image to identify a plurality of entities in the first image. At 914, control circuitry 416 determines whether the second path intersects any entity of the plurality of entities. This can be accomplished using methods described above in connection with FIG. 6. If so ("Yes" and 914), then, at 916, control circuitry 416 determines, as the second entity, the entity of the plurality of entities with which the second path intersects. If not ("No" at 914), then, at 918, control circuitry 416 generates for output to the user a prompt to identify the second entity. These actions may be accomplished using methods described above in connection with FIG. 6.

As an example, in some cases, the media device may be a smartphone having both a front-facing camera and at least one rear-facing camera. The user may be holding the smartphone with sufficient space to make a gesture between the user and the smartphone. The smartphone captures an image of the gesture using the front-facing camera and processes it to extrapolate a path corresponding to the gesture. The smartphone also uses at least one rear-facing camera to capture an image of the area corresponding to the direction of the gesture. The smartphone, using the position and angle of one camera relative to the other camera, maps the extrapolated path of the gesture from the first image onto the second image and identifies an entity in the second image that intersects the extrapolated path as the selected entity.

The actions or descriptions of FIG. 9 may be used with any other embodiment of this disclosure. In addition, the actions and descriptions described in relation to FIG. 9 may be done in any suitable alternative orders or in parallel to further the purposes of this disclosure.

Figure 10:
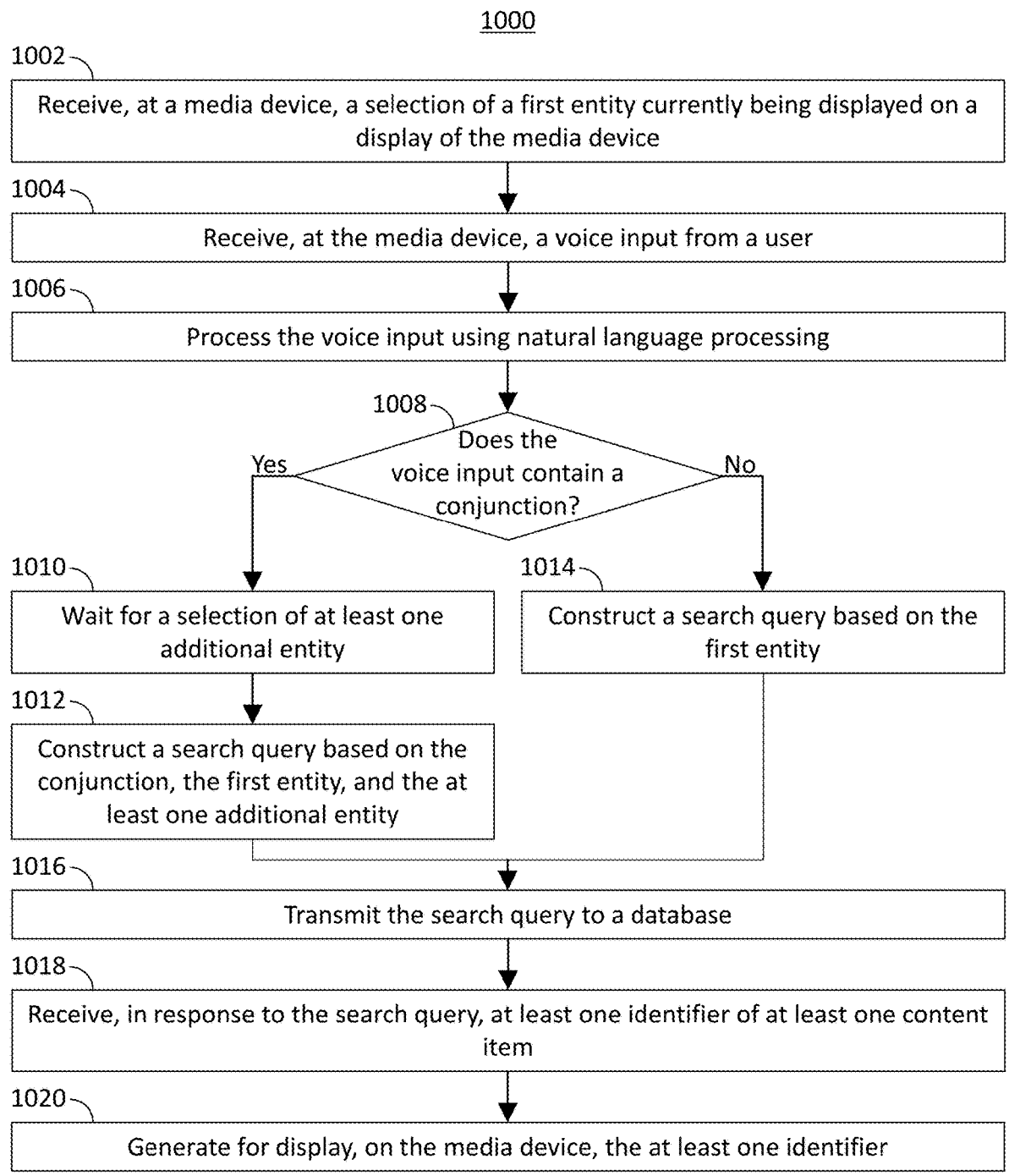
FIG. 10 is a flowchart representing a process for performing a search based on a voice input and selection of multiple entities based on a conjunction included in the voice input, in accordance with some embodiments of the disclosure.

FIG. 10 is a flowchart representing an illustrative process 1000 for performing a search based on a voice input and selection of multiple entities based on a conjunction included in the voice input, in accordance with some embodiments of the disclosure. Process 1000 may be implemented on control circuitry 416. In addition, one or more actions of process 1000 may be incorporated into or combined with one or more actions of any other process or embodiment described herein.

At 1002, media device 400 receives, using input circuitry 408, a selection of a first entity currently being displayed on a display of media device 400. This may be accomplished using methods described above in connection with FIG. 5. At 1004, media device 400 receives, using audio input circuitry 404, a voice input from the user. This may also be accomplished using methods described above in connection with FIG. 5.

At 1006, control circuitry 416, using natural language processing circuitry 422, processes the voice input. Natural language processing circuitry 422 identifies each word spoken in the voice input and determines a part of speech for each identified word. At 1008, control circuitry 416 determines whether the voice input contains a conjunction. If so ("Yes" at 1008), then, at 1010, control circuitry 416 waits for a selection of at least one additional entity. Once selection of at least one additional entity has been received, at 1012, control circuitry 416, using query construction circuitry 426, constructs a search query based on the conjunction, the first entity, and the at least one additional entity. If no conjunction is detected in the voice input ("No" at 1008), then, at 1014, control circuitry 416, using query construction circuitry 426, constructs a search query based on only the first entity.

At 1016, control circuitry 416, using transceiver circuitry 440, transmits the constructed query to a database. The database may be stored locally in memory of media device 400 or may be stored at a remote server. At 1018, control circuitry 416, using transceiver circuitry 440, receives, in response to the search query, at least one identifier of at least one content item that matches the search query and, at 1020, generates the at least one identifier for display to the user on media device 400.

The actions or descriptions of FIG. 10 may be used with any other embodiment of this disclosure. In addition, the actions and descriptions described in relation to FIG. 10 may be done in any suitable alternative orders or in parallel to further the purposes of this disclosure.

Figure 11:
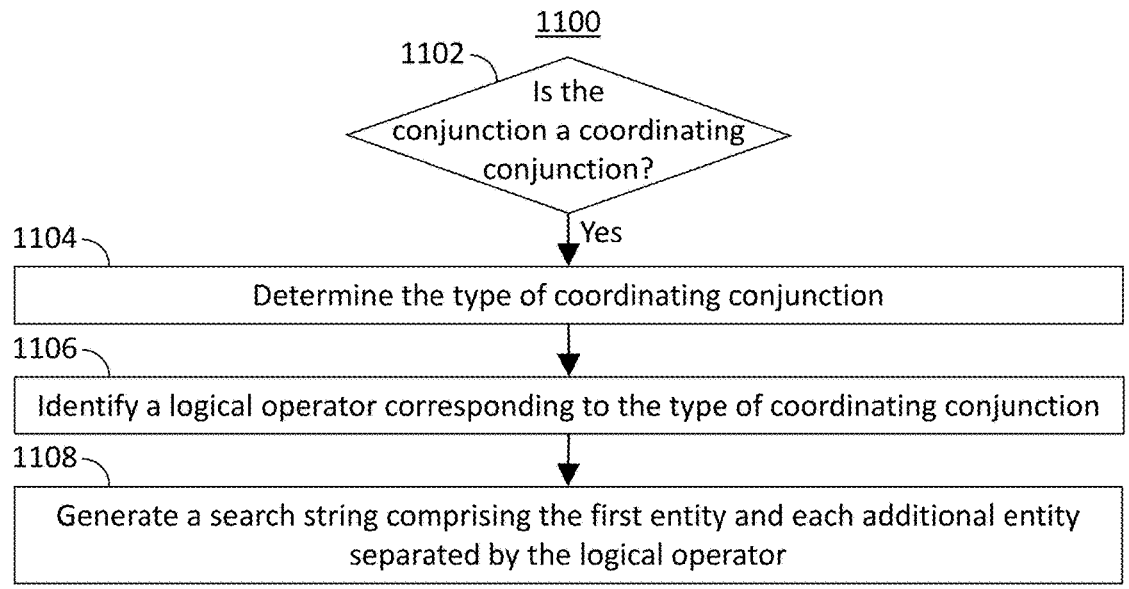
FIG. 11 is a flowchart representing a first process for generating a search string based on the conjunction, in accordance with some embodiments of the disclosure.

FIG. 11 is a flowchart representing an illustrative process 1100 for generating a search string based on the conjunction, in accordance with some embodiments of the disclosure. Process 1100 may be implemented on control circuitry 416. In addition, one or more actions of process 1100 may be incorporated into or combined with one or more actions of any other process or embodiment described herein.

At 1102, control circuitry 416, using natural language processing circuitry 422, determines whether the detected conjunction is a coordinating conjunction (e.g., and, but, or). If so, then, at 1104, natural language processing circuitry 422 determines a type of the coordinating conjunction. For example, the conjunction "and" is conjunctive while the conjunction "or" is disjunctive. At 1106, control circuitry 416, using query construction circuitry 426, determines a logical operator associated with the type of coordinating conjunction. For example, an "AND" logical operator corresponds to a conjunctive conjunction, while an "OR" logical operator corresponds to a disjunctive conjunction. At 1108, query construction circuitry 426 generates a search string comprising the first entity and each additional entity separated by the logical operator. In some embodiments, additional conjunctions are detected and associated with the selection of each additional entity. Query construction circuitry 426 may group entities associated with the same type of conjunction together when generating the search string.

The actions or descriptions of FIG. 11 may be used with any other embodiment of this disclosure. In addition, the actions and descriptions described in relation to FIG. 11 may be done in any suitable alternative orders or in parallel to further the purposes of this disclosure.

Figure 12:
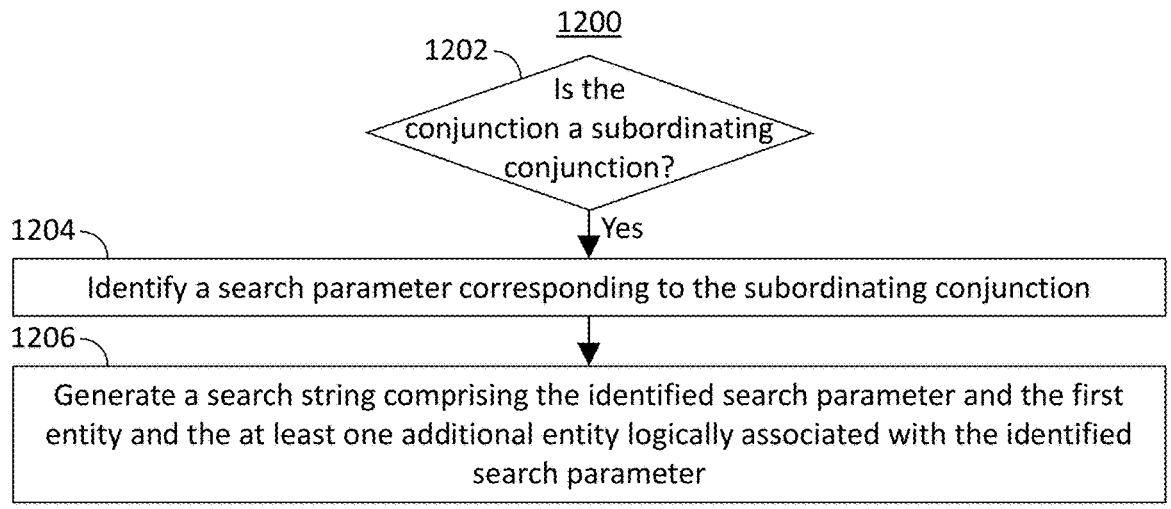
FIG. 12 is a flowchart representing a second process for generating a search string based on the conjunction, in accordance with some embodiments of the disclosure.

FIG. 12 is a flowchart representing a second illustrative process 1200 for generating a search string based on the conjunction, in accordance with some embodiments of the disclosure. Process 1200 may be implemented on control circuitry 416. In addition, one or more actions of process 1200 may be incorporated into or combined with one or more actions of any other process or embodiment described herein.

At 1202, control circuitry 416, using natural language processing circuitry 422, determines whether the detected conjunction is a subordinating conjunction (e.g., while, unless, when). If so, then, at 1204, query construction circuitry 426 determines a search parameter corresponding to the subordinating conjunction. For example, if the subordinating conjunction is "when," query construction circuitry 426 may determine that the user is searching for content with a certain release date. At 1206, query construction circuitry 426 generates a search string comprising the identified search parameter and the first entity and each additional entity logically associated with the search parameter. For example, the user may say "Show me movies with him when that still stood." The pronoun "him" refers to an actor selected by the user. The pronoun "that" refers to a landmark that no longer exists (selected from a picture taken at a time when the landmark did exist), such as the Twin Towers in New York City. The conjunction "when" is used as a search parameter to select movies featuring the selected actor that were released before Sep. 11, 2001. Query construction circuitry 426 generates, for example, the SQL search string "SELECT*FROM movie WHERE actor={first entity} and release_date<9/11/2011".

The actions or descriptions of FIG. 12 may be used with any other embodiment of this disclosure. In addition, the actions and descriptions described in relation to FIG. 12 may be done in any suitable alternative orders or in parallel to further the purposes of this disclosure.

Figure 13:
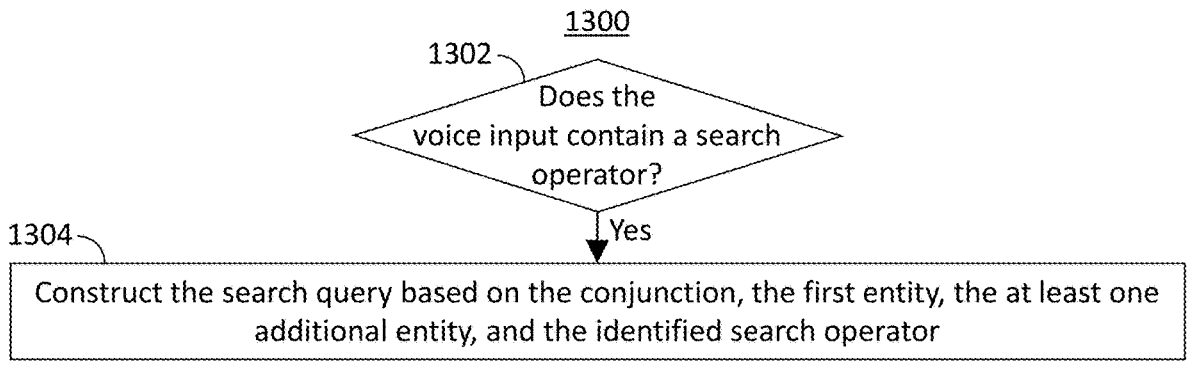
FIG. 13 is a flowchart representing a process for constructing a search query based on the conjunction, in accordance with some embodiments of the disclosure.

FIG. 13 is a flowchart representing an illustrative process 1300 for constructing a search query based on the conjunction, in accordance with some embodiments of the disclosure. Process 1300 may be implemented on control circuitry 416. In addition, one or more actions of process 1300 may be incorporated into or combined with one or more actions of any other process or embodiment described herein.

At 1302, control circuitry 416, using natural language processing circuitry 422, determines whether the voice input contains a search operator. For example, the words "show me" or "find" are used by the user to instruct media device 400 to perform a search. If the voice input does contain a search operator, then, at 1304, control circuitry 416, using query construction circuitry 426, constructs a search query based on the conjunction, the first entity, the at least one additional entity, and the search operator.

The actions or descriptions of FIG. 13 may be used with any other embodiment of this disclosure. In addition, the actions and descriptions described in relation to FIG. 13 may be done in any suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method, comprising:
receiving input from a user via a user input interface of a media device;
processing the input to identify a particular pronoun;
identifying a gesture made by the user;
processing an image associated with the gesture to determine a plurality of identities of a plurality of entities, respectively, in the image, displayed on a display of the media device;
determining, based on the plurality of identities, a respective pronoun for each entity of the plurality of entities;
determining, from among the plurality of entities, a particular entity having a pronoun that corresponds to the particular pronoun identified based on the input, wherein the particular entity is displayed on the display of the media device;
querying a database based on the input and the particular entity;
based on querying the database, receiving at least one identifier of at least one content item; and
generating for presentation, using the media device, the at least one identifier of the at least one content item.

2. The method of claim 1, wherein the input is a voice input, the particular entity is a second entity, and the method further comprises:
receiving, at the media device, a selection of a first entity currently being displayed on the display of the media device; and
processing the voice input to identify a search operator, wherein querying the database comprises constructing a search query based on the identified search operator, the first entity and the second entity.

3. The method of claim 1, wherein the image is captured by an imaging sensor, and identifying the gesture made by the user comprises determining, based on the image, motion of the user.

4. The method of claim 1, wherein the image is captured by an imaging sensor, and determining the particular entity associated with the gesture further comprises:
determining a direction of the gesture; and
determining that the direction of the gesture corresponds to the image, the image depicting a real-world scene proximate to the user.

5. The method of claim 4, wherein determining the particular entity associated with the gesture further comprises:
performing image processing of the image to determine a plurality of portions of the image that respectively correspond to the plurality of entities;
based on the direction of the gesture, extrapolating a path of the gesture to a portion of the image; and
determining as the particular entity an entity of the plurality of entities associated with the portion of the image that the path intersects.

6. The method of claim 4, wherein the imaging sensor is a first imaging sensor, the image captured by the first imaging sensor is a first image, and the method further comprises:
determining that a second image captured by a second imaging sensor depicts a different perspective of the real-world scene than a perspective of the real-world scene depicted in the first image;
extrapolating a first path from the direction of the gesture in the first image;
extrapolating a second path from the direction of the gesture in the second image;
identifying a point at which the first path crosses the second path; and
determining as the particular entity an entity of the plurality of entities associated with the point of the image at which the first path crosses the second path.

7. The method of claim 4, wherein the imaging sensor is a first imaging sensor, the image captured by the first imaging sensor is a first image, and the method further comprises:
determining that a second image, captured by a second imaging sensor that is facing a second direction, depicts an area in which the user made the gesture;
performing image processing of the second image to identify the gesture;
extrapolating a first path from the direction of the gesture in the second image;
calculating, based on a position and an angle of the first imaging sensor and a position and an angle of the second imaging sensor, a second path in the first image corresponding to the first path;
performing image processing of the first image to determine a plurality of portions of the first image that respectively correspond to the plurality of entities; and
determining as the particular entity an entity of the plurality of entities associated with the portion of the image that the second path intersects.

8. The method of claim 1, wherein the media device is a first media device, the method further comprising:
generating, for presentation at a second media device proximate to the first media device, a content item,
wherein the image associated with the gesture corresponds to a frame of the content item being presented at the second media device.

9. The method of claim 8, wherein the particular entity is a first entity, the content item is a first content item, and the method further comprises:
generating, for presentation at the first media device while the first content item is being presented at the second media device, a second content item,
wherein the input is a voice input, and the voice input comprises a reference to a second entity depicted in a frame of the second media device, the querying of the database being further based on the second entity.

10. The method of claim 1, wherein determining, based on the plurality of identities, the respective pronoun for each entity of the plurality of entities comprises:
determining a first pronoun for a first entity of the plurality of entities; and
determining a second pronoun for a second entity of the plurality of entities;
wherein determining the particular entity having a pronoun that corresponds to the particular pronoun is based on the first pronoun for the first entity of the plurality of entities and the second pronoun for a second entity of the plurality of entities.

11. A computer-implemented system, comprising:
input/output (I/O) circuitry configured to:
receive input from a user via a user input interface of a media device;
control circuitry configured to:
process the input to identify a particular pronoun;
identify a gesture made by the user;
process an image associated with the gesture to determine a plurality of identities of a plurality of entities, respectively, in the image, the image displayed on a display of the media device;
determine, based on the plurality of identities, a respective pronoun for each entity of the plurality of entities;
determine, from among the plurality of entities, a particular entity having a pronoun that corresponds to the particular pronoun identified based on the input, wherein the particular entity is displayed on the display of the media device; and
query a database based on the input and the particular entity,
wherein the I/O circuitry is further configured to:
based on querying the database, receive at least one identifier of at least one content item; and
generate for presentation, using the media device, the at least one identifier of the at least one content item.

12. The system of claim 11, wherein:
the input is a voice input, the particular entity is a second entity;
the I/O circuitry is further configured to receive, at the media device, a selection of a first entity currently being displayed on the display of the media device; and
the control circuitry is further configured to:
process the voice input to identify a search operator; and
query the database by constructing a search query based on the identified search operator, the first entity and the second entity.

13. The system of claim 11, wherein the image is captured by an imaging sensor, and the control circuitry is configured to identify the gesture made by the user by determining, based on the image, motion of the user.

14. The system of claim 11, wherein the image is captured by an imaging sensor, and the control circuitry is configured to determine the particular entity associated with the gesture by:
determining a direction of the gesture; and
determining that the direction of the gesture corresponds to the image, the image depicting a real-world scene proximate to the user.

15. The system of claim 14, wherein the control circuitry is configured to determine the particular entity associated with the gesture by:
performing image processing of the image to determine a plurality of portions of the image that respectively correspond to the plurality of entities;
based on the direction of the gesture, extrapolating a path of the gesture to a portion of the image; and
determining as the particular entity an entity of the plurality of entities associated with the portion of the image that the path intersects.

16. The system of claim 14, wherein the imaging sensor is a first imaging sensor, the image captured by the first imaging sensor is a first image, and the control circuitry is further configured to:
determine that a second image captured by a second imaging sensor depicts a different perspective of the real-world scene than a perspective of the real-world scene depicted in the first image;
extrapolate a first path from the direction of the gesture in the first image;
extrapolate a second path from the direction of the gesture in the second image;

identify a point at which the first path crosses the second path; and determine as the particular entity an entity of the plurality of entities associated with the point of the image at which the first path crosses the second path.

17. The system of claim 14, wherein the imaging sensor is a first imaging sensor, the image captured by the first imaging sensor is a first image, and the control circuitry is further configured to:

determine that a second image, captured by a second imaging sensor that is facing a second direction, depicts an area in which the user made the gesture;

perform image processing of the second image to identify the gesture;

extrapolate a first path from the direction of the gesture in the second image;

calculate, based on a position and an angle of the first imaging sensor and a position and an angle of the second imaging sensor, a second path in the first image corresponding to the first path;

perform image processing of the first image to determine a plurality of portions of the first image that respectively correspond to the plurality of entities; and determine as the particular entity an entity of the plurality of entities associated with the portion of the image that the second path intersects.

18. The system of claim 11, wherein the media device is a first media device, and the control circuitry is further configured to:

generate, for presentation at a second media device proximate to the first media device, a content item, wherein the image associated with the gesture corresponds to a frame of the content item being presented at the second media device.

19. The system of claim 18, wherein the particular entity is a first entity, the content item is a first content item, and the control circuitry is further configured to:

generate, for presentation at the first media device while the first content item is being presented at the second media device, a second content item, wherein the input is a voice input, and the voice input comprises a reference to a second entity depicted in a frame of the second media device, the querying of the database being further based on the second entity.

20. The system of claim 11, wherein the control circuitry is configured, when determining the respective pronoun for each entity of the plurality of entities, to:

determine a first pronoun for a first entity of the plurality of entities; and determine a second pronoun for a second entity of the plurality of entities;

wherein determining the particular entity having a pronoun that corresponds to the particular pronoun is based on the first pronoun for the first entity of the plurality of entities and the second pronoun for a second entity of the plurality of entities.

* * * * *